INVENTOR.
HOWARD L. STAHLE
BY Joseph Dwyer
ATTORNEY

INVENTOR.
HOWARD L. STAHLE
BY Joseph R. Dwyer
ATTORNEY

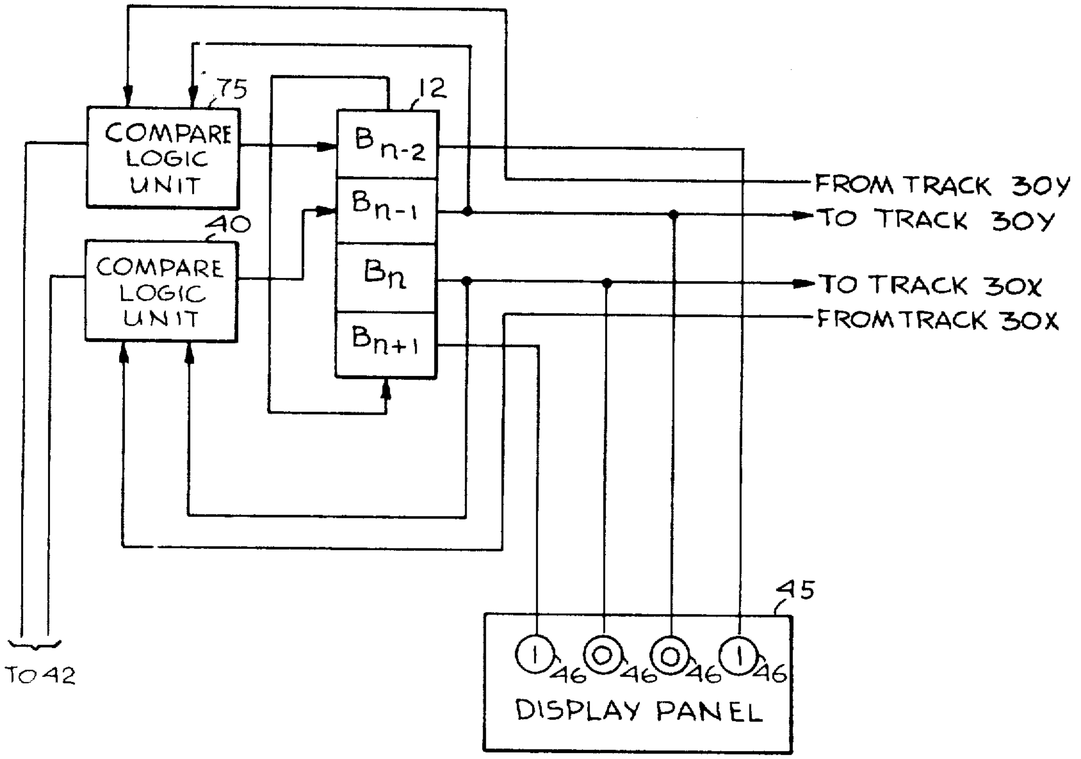
Fig. 6
| | | | | |
|---|---|---|---|---|
| R1 | 1 | 0 | 0 | 1 |
| R2 | 1 | 1 | 0 | 0 |
| R3 | 1 | 1 | 1 | 0 |
| R4 | 1 | 1 | 0 | 1 |
Fig. 7
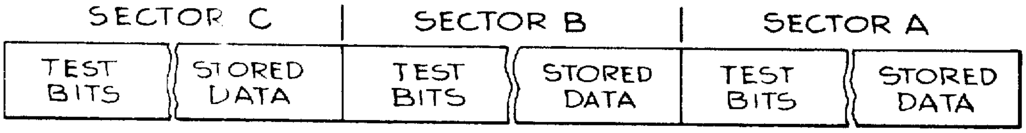
Fig. 8
INVENTOR.
HOWARD L. STAHLE
BY Joseph Dwyer
ATTORNEY

United States Patent Office 3,439,343

Patented Apr. 15, 1969

3,439,343

COMPUTER MEMORY TESTING SYSTEM

Howard L. Stahle, Tujunga, Calif., assignor to Singer-General Precision, Inc., a corporation of Delaware Filed July 12, 1966, Ser. No. 564,603
Int. Cl. G11b 13/00
U.S. Cl. 340—172.5 5 Claims

ABSTRACT OF THE DISCLOSURE

A system for automatically checking out the sequential storing of bits of data in a memory track and the reading out of stored data bits therefrom, including a circulatory multi-element shift register. The bits circulating through a selected element of the register are used to activate a write amplifier to sequentially store the bit in the memory track. Then during a read mode of operation the bits circulating through the selected element are compared bit by bit with the bits sequentially read out from the memory track. The readout operation is interrupted whenever the two compared bits represent different binary values.

This invention relates to computer circuitry and, more particularly, to a system for testing the performance of a computer memory, including write and read circuitry associated therewith.

The advances made in the computer art have led to the development of large capacity memories, capable of storing large quantities of binary data. An example of such a memory is one utilizing magnetic discs, each disc capable of storing as many as 1,000 bits per inch of its surface, which is coated with a magnetic material. Usually, a plurality of magnetic heads are radially disposed about the disc surface. Each head is coupled to write and read amplifiers so that as the disc rotates, binary signals or bits may be written into or read out of the disc's magnetic material, which passes under the head. The disc surface passing under each head is generally referred to as a track.

Since the proper storing and retrieval of data from each track depends on the magnetic characteristics of the material of the track, the head and the amplifiers associated therewith, these have to be checked out during the final stages of constructing the memory, as well as during normal operation, to insure proper memory performance. The cost of checking out and/or maintaining the memory to be in proper operating condition is generally very time consuming and expensive. This is due to the very large number of write and read circuits associated with the memory. In a magnetic disc type memory, in addition to the write and read circuits, the magnetic heads must be carefully checked out for proper operation. Also, since in such a memory, the magnetic heads are generally placed in close proximity to one another, the effect of signals in one magnetic head on tracks associated with adjacent located heads, generally referred to as cross interference, must be carefully determined. Herebefore, check-out has been generally performed by trained operators who manually inspect the large number of magnetic heads, and the circuits associated therewith to determine the proper operations thereof.

Accordingly, it is an object of the present invention to provide a system for automatically checking out a computer memory and its associated circuitry.

Another object is to provide a relatively simple system for automatically checking out each of a plurality of computer memory tracks and their associated circuitry.

A further object is the provision of a relatively simple system for automatically and simultaneously checking out a plurality of memory tracks to reduce the time required for memory check-out.

Still a further object is to provide a system for automatically checking out a multitrack memory to determine cross interference characteristics due to closely spaced magnetic heads associated with adjacent memory tracks.

Still a further object is the provision of a system for checking out the performance of a memory and its associated circuitry without affecting any data previously stored therein.

These and other objects of the invention are achieved by providing a system, operable in write and read modes. The system includes a multi-element shift register. Each element may comprise a flip-flop having bistable stages, so that each stage may represent a different binary signal, such as a binary "1" or a binary "0." The shift register, incorporated in the present invention, has its output connected to its input, so that any chosen multibit pattern or sequence may continuously circulate through each of the register's elements. In a system limited to checking out each memory track and its associated circuitry at a time, one of the register's elements is connected during the write mode of operation to a write amplifier, associated with the particular track which is being checked out, so that the sequence repeatedly circulating through the particular register element is stored serially, bit by bit, in the track or any selected portions thereof.

Thereafter, the system is switched to its read mode. The data bits stored in the track are read out serially, bit by bit, by an associated read amplifier, and supplied to a compare logic circuit, together with data bits circulating through the particular register element. In the absence of error in the stored and retrieved data, the bits supplied to the compare logic circuit during each clock pulse time interval, are the same. As a result, the particular register element transfers the bit stored therein to a preceding element of the register, as in the case in a conventional shift register. If however, due to malfunction of any of the circuits associated with the particular track, the bit received from the read amplifier is not the same as the bit in the particular element, the compare logic circuit provides an error signal which disrupts the read operation to enable an operator to determine and eliminate the cause of error. In addition, the bit stored in the preceding element is that supplied to the compare logic circuit from the memory track, rather than from the particular register elements.

A plurality of memory tracks may be checked out simultaneously by connecting each track to another of the shift register elements, so that during the write mode, the sequence circulating through each of the register elements is stored in another track connected thereto. Then during each clock pulse time interval, in the read mode, the bit from each register element and its corresponding track are supplied to another compare logic circuit, any one of which may produce an error signal which disrupts the read operation when the two bits supplied thereto differ from one another. In order to assist an operator to determine which of the plurality of tracks, simultaneously being checked out, produced the error, the particular compare logic circuit providing the error signal also alters the bit in the register element preceding its respective element, thereby altering the sequence in the preceding element, from that expected therein. The change or alteration of the sequence in the preceding element is displayed on a display panel, so that the operator may determine which of the plurality of memory tracks simultaneously checked out is defective.

The novel features that are considered characteristic of this invention are set forth with particularity in the appended claims. The invention will best be understood from the following description when read in connection with the accompanying drawings, in which:

FIGURE 6 is a partial block diagram of another embodiment of the invention;

FIGURE 7 is a chart useful in explaining the operation of the embodiment of FIGURE 6 in a read mode of operation; and FIGURE 8 is a diagram of another word format.

Figure 1:
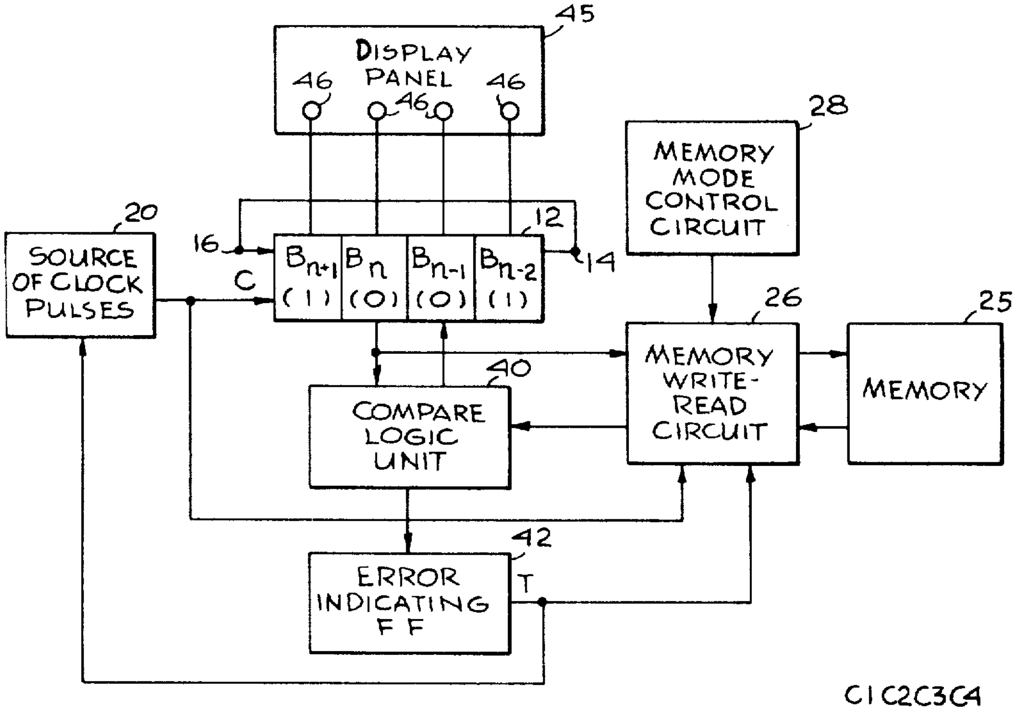
FIGURE 1 is a block diagram of one embodiment of the invention.
Figure 2:
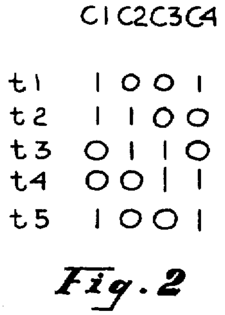
FIGURE 2 is a chart useful in explaining the different states of register 12 shown in FIGURE 1.

Reference is now made to FIGURE 1 which is a simplified block diagram of the check-out system of the present invention. There is shown a shift register 12, comprising a plurality of bistable elements such as flip-flops, designated $B_{n+1}$, $B_n$, $B_{n-1}$, and $B_{n-2}$. Although the register is shown as comprising four elements, it is appreciated that any number of elements may be incorporated therein. The register's output terminal 14 is connected to an input terminal 16. A source of clock pulses 20 is also connected to register 12 to provide it with clock pulses C, so that during the time interval of each clock pulse the bit stored in each register element is transferred and stored in a preceding element thereof, with the bit stored in the first element $B_{n-2}$ being transferred through the output and input terminals to the last element $B_{n+1}$. Thus, assuming that the bits stored in the four elements shown in FIGURE 1 at a time $t_1$ are 1001, the bits stored during subsequent time intervals $t_2$ through $t_5$ are as diagrammed in FIGURE 2 to which reference is made herein. That is, at time $t_2$, the bit in each element is shifted to the element to the right, so that at the end of clock pulse time interval $t_2$, the bits stored in the four elements are 1100, read from left to right. The bits stored in each of the elements may be thought of as defining a multibit sequence which is serially stored in each element, bit by bit. Thus, starting with time $t_1$ the sequence repeatedly stored in element $B_n$ may be thought of as 0110, as diagrammed in column C2 of FIGURE 2.

Figure 3:
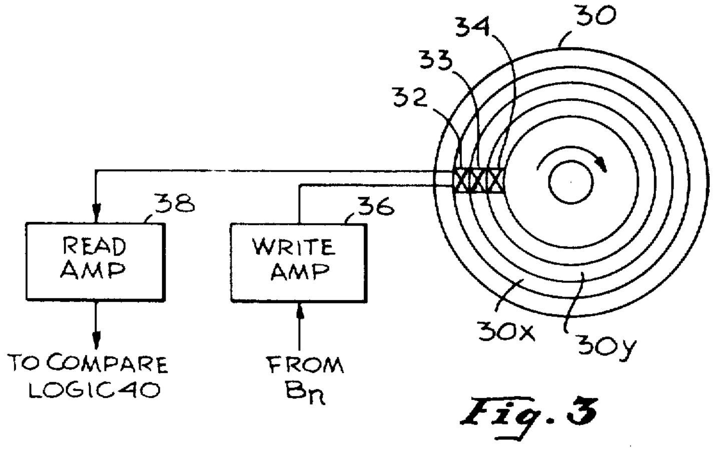
FIGURE 3 is a diagram of a magnetic disc type memory with associated magnetic heads and amplifiers.

Referring again to FIGURE 1, element $B_n$ is shown connected to a memory 25 through a memory write/read circuit 26 which is controlled by a memory mode control circuit 28. The function of the latter circuit is to control the memory and circuitry associated therewith, to operate either in a write mode when binary data is written thereinto, or in a read mode when data is read out therefrom. Memory 25 is assumed to include a plurality of tracks or addresses in which binary data or bits may be serially stored therein. One example of a memory in which binary bits are serially written into and read out therefrom is one employing magnetic discs one of which designated by numeral 30 is diagrammed in FIGURE 3, to which reference is made herein.

Figure 4:
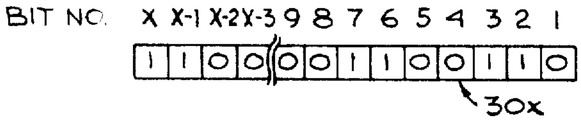
FIGURE 4 is a format diagram of one track in the disc shown in FIGURE 3.

As is appreciated by those familiar with the art, in a magnetic disc memory, a plurality of magnetic heads such as heads 32, 33, and 34 are radially disposed about the surface of the disc. Each head, such as head 32, is associated with a write amplifier 36 and a read amplifier 38, which are assumed to form part of the memory write/read circuit 26. During the write mode of operation controlled by circuit 28 (FIGURE 1), write amplifier 36 is energized so that the bits supplied from element $B_n$ are transferred to head 32 to be stored on the portion **30*x* of the surface of the magnetic disc passing by head 32. The surface portion 30*x* is generally referred to as a track. Thus, successive bits stored in element $B_n$ of register 12 during successive clock pulse time intervals, are transferred and stored in track 30*x* of disc 30. The format of track 30*x*, assumed to comprise of X bits, is diagrammatically represented in FIGURE 4 to which reference is made herein. Each bit of track 30*x*** is shown storing a different one of the bits supplied thereto from element $B_n$.

Then, during a subsequent read mode of operation, when element $B_n$ stores the first bit, i.e., a "0," of the sequence stored therein, the bits from track **30*x* are serially read out through read amplifier 38. The output of amplifier 38 as well as the output of element $B_n$ are supplied to a compare logic unit 40. The function of unit 40 is to compare the two bits supplied thereto during each clock pulse time interval. When the two bits are the same, logic unit 40 energizes the preceding element in the shift register, i.e. elements $B_{n-1}$ to store the bit stored in element $B_n$. Thus for example, if the bit from element $B_n$ is a binary "1" and the bit read out of track 30*x* through read amplifier 38 is similarly a binary "1," compare logic unit 40 energizes element $B_{n-1}$ to store a binary "1." Similarly, if the bit from element $B_n$ is a binary "0" and it compares favorably with a binary "0" supplied from track 30*x***, a binary "0" is stored in element $B_{n-1}$.

However, if the two bits supplied to compare logic unit 40 differ from one another, the bit supplied to the preceding element $B_{n-1}$ is that received from the memory track **30*x*. Also, compare logic unit 40 upon sensing the difference between the two bits compared therein provides an error indicating signal to an error indicating flip-flop 42. The latter mentioned signal sets flip-flop 42 to a state whereby a true output signal is supplied to clock pulse source 20 and the memory write/read circuit 26 to disrupt the read mode operation, as well as, to disrupt the supply of clock pulses to register 12. As a result, the read operation ceases, and the bits stored in the elements of the shift register 12 include an erroneous setting of element $B_{n-1}$. The setting of the elements of shift register 12 may be conveniently displayed by means of a display panel 45 including a plurality of indicators such as lights 46** each connected to another of the register elements.

The principles of operation of the checkout circuit of the present invention may further be described in conjunction with a specific example. Let it be assumed that during the first four clock pulse time intervals in the read mode element $B_n$ stores bits 0110, and similar bits are transferred from track **30*x* through read amplifier 38 to the compare logic unit 40. Then from the foregoing, it should be appreciated that during each time interval, the two bits supplied to the compare logic unit 40 are the same and therefore the bit received from element $B_n$ is transferred to the preceding element $B_{n-1}$. However, during the fifth clock pulse time interval, when element $B_n$ supplies a binary "0" to compare logic unit 40, the bit from track 30*x* is a binary "1," resulting from the malfunctioning of one of the circuits associated with track 30*x*, compare logic unit 40** detects the difference between the two bits supplied thereto.

Upon detecting the error, error indicating flip-flop 42 is set to provide a true output signal which interrupts the read operation as well as the supply of clock pulses to the register 12. Also, due to the difference in the bits supplied to compare logic unit 40, the bit received from track **30*x***, i.e. the binary "1," is transferred to the preceding shift register element $B_{n-1}$. As a result, at the end of the particular clock pulse time interval, all but element $B_n$ store binary "1's" which is an erroneous setting for the shift register since the expected setting of the register in binary "1's" in the first and last bits and binary "0's" in the middle elements.

The interruption of the read mode operation, as well as, the interruption of the bits circulating in register 12 indicates a malfunction of any one of the circuits associated with track 30*x* or imperfections in the magnetic coating of the track. Thus an operator, upon sensing the interruption of the operation, may inspect each of the circuits as well as the surface of track 30*x* to determine the cause of the malfunction. After repairing the particular circuit, the operator by means of display panel 45, may reset element $B_{n-1}$ to the expected setting thereof had an error not been discovered in order to continue the read operation of track 30*x*. After testing track 30*x* and the associated circuitry thereof, the system may again be switched to the write mode of operation with the outputs of element $B_n$ being supplied to another write element, associated with another magnetic head, such as head 34, in order to check the performance of the circuitry associated with head 34 and the magnetic characteristics of the disc track adjacent thereto. As will be explained hereafter in detail, a plurality of magnetic heads with their associated amplifiers and magnetic tracks may be simultaneously checked out, in order to reduce the time required for the automatic checking out of the various memory circuits and components.

Figure 5:
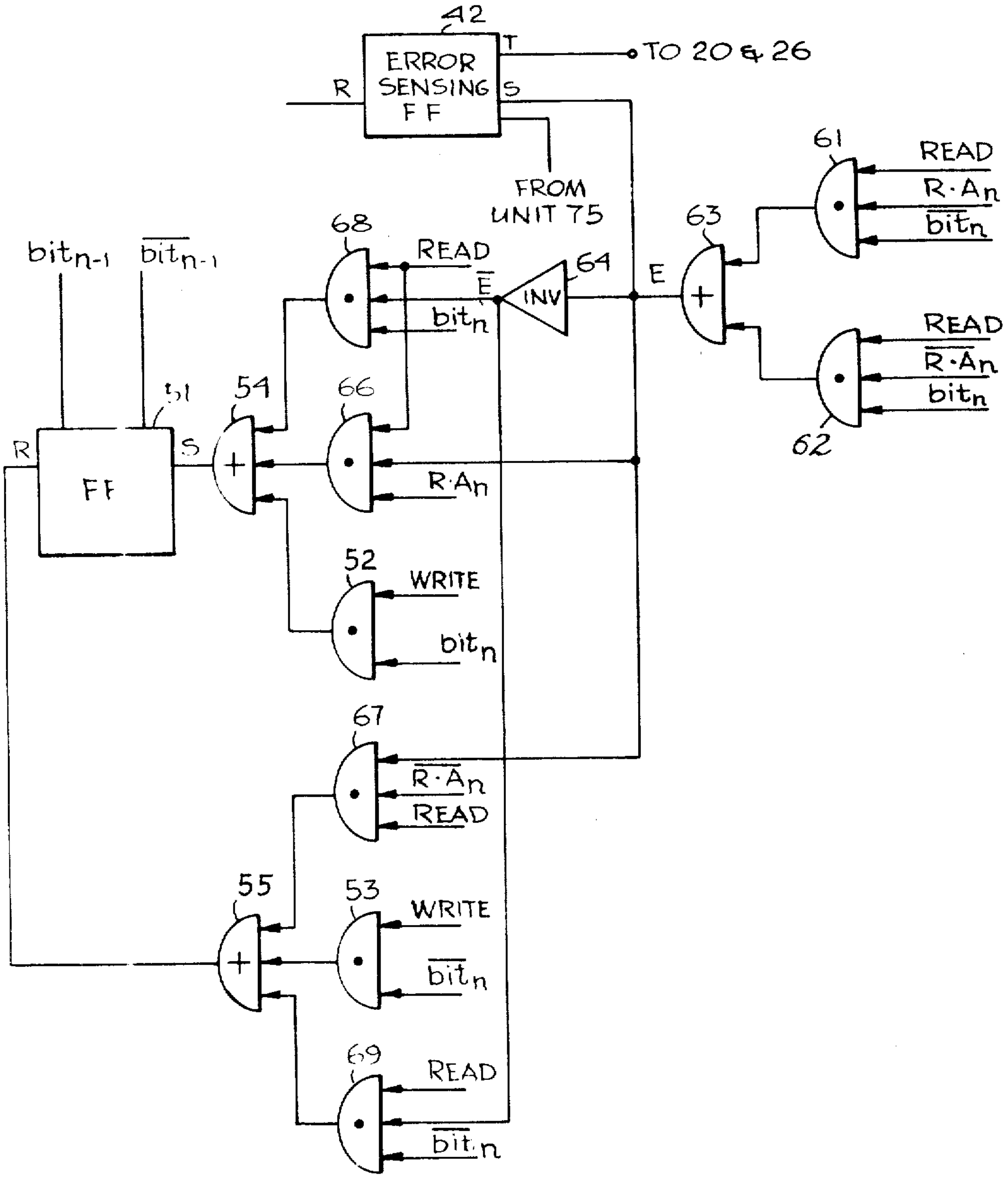
FIGURE 5 is a complete logic diagram of the embodiment shown in FIGURE 1.

Reference is now made to FIGURE 5 which is a diagram of one embodiment of logic circuitry, necessary to perform the functions of the compare logic unit unit 40 and one of the register elements, such as $B_{n-1}$. Hereafter, for explanatory purposes only, it is assumed that a binary "1" is represented by a true signal while a binary "0" is represented by a false signal. In FIGURE 5, the write and read signals are assumed to be supplied from the memory mode control circuit 28 (FIGURE 1) during the write and read modes respectively. Signal $R \cdot A_n$ represents the output of a read amplifier such as amplifier 38 (FIGURE 3) while the signal $bit_n$ represents the signal from the succeeding element $B_n$.

The register element $B_{n-1}$ is assumed to include a flip-flop 51 having set and reset input terminals designated S and R respectively. For explanatory purposes, let it be assumed that when flip-flop 51 is provided with a true signal at the set input terminal, the flip-flop is set to store a binary "1," indicated by a true signal on output line designated $bit_{n-1}$, while a true signal at the reset, R, input terminal resets flip-flop 51 to store a binary "0" which is represented by a true output on output line designated $\overline{bit}_{n-1}$.

The flip-flop 51 is associated with a pair of AND gates 52 and 53, coupled to the S and R input terminals through OR gates 54 and 55, respectively. Each of gates 52 and 53 is provided with a true write signal during the write mode of operation. Gates 52 and 53 are also coupled to the $bit_n$ and $\overline{bit}_n$ output terminals of the succeeding element $B_n$. During the write mode of operation, if element $B_n$ stores a binary "1," gate 52 is enabled to provide a true signal which in turn enables OR gate 54 to set flip-flop 51 to store a binary "1" therein, thereby transferring the binary "1" from element $B_n$ to element $B_{n-1}$. On the other hand, if during the write mode of operation, the bit stored in element $B_n$ is a binary "0," gate 53 is enabled to reset flip-flop 51 through OR gate 55 thereby resetting flip-flop 51 to store a binary "0" supplied thereto from the succeeding register element.

The rest of the gates shown in FIGURE 5 may be assembled to comprise the compare logic unit 40 hereinbefore described. Unit 40 includes AND gates 61 and 62, each having three input lines, one of which is connected to receive a read signal from the memory mode control circuit 28, during the read mode of operation. The other two input lines of each of the gates are connected to the flip-flop of the succeeding register element $B_n$ and the read amplifier coupled to the particular compare logic unit. When the bit read out from memory through read amplifier 38 is a binary "1," the output signal $R \cdot A_n$ of the read amplifier is true, while the complementary output $\overline{R} \cdot \overline{A}_n$ is true when the bit read out of the memory is a binary "0."

Neither of gates 61 and 62 is enabled whenever the bits supplied thereto from the succeeding register element $B_n$ and the memory are the same. However, if the two bits differ from one another, either gate 61 or gate 62 is enabled to in turn enable OR gate 63, a true output of which represents an error signal. The error signal is supplied to a set input terminal of error sensing flip-flop 42 to set the flip-flop so as to provide a true output signal which is supplied to the source of clock pulses 20 and the memory write/read circuit 26 to interrupt the operations thereof as previously explained. For example, when the bit from the memory is a binary "1" and the bit from element $B_n$ is a "0," the three inputs to gate 61 are true and therefore the gate provides a true output signal which enables OR gate 63. On the other hand, if the bit from memory is a binary "0" and the bit from register element $B_n$ is a binary "1," gate 62 is enabled which in turn provides a true signal to OR gate 63.

The output of gate 63 is designated by letter E which is true whenever an error indicating signal is produced. This output is inverted by an inverter 64, the output of which is designated by $\overline{E}$ which is true in the absence of an error signal. The output of OR gate 63 is also supplied to AND gates 66 and 67, each having another input terminal connected to receive the read signal. Gate 66 is also connected to the output terminal $R \cdot A_n$ of the read amplifier, while gate 67 is connected to the complementary output terminal of the read amplifier. The outputs of gates 66 and 67 are connected to input terminals of OR gates 54 and 55 respectively.

The function of AND gates 66 and 67 is to store in the flip-flop 51 of register element $B_{n-1}$ the bit received from memory, whenever the compare logic unit 40 provides an error signal. Thus, when an error signal is present, and the bit from memory is a binary "1," gate 66 is enabled setting flip-flop 51 to a binary "1" state. On the other hand, if the bit from memory is a binary "0," gate 67 is enabled to reset flip-flop 51 to a binary "0" state. However, in the absence of an error signal, i.e. when the two bits supplied to the compare logic unit 40 are the same, the output of OR gates 63 is false inhibiting the operation of AND gates 66 and 67.

When the output of OR gate 63 is false, the output of inverter 64, i.e. signal $\overline{E}$ is true, thereby enabling either of AND gates 68 and 69 to which it is connected. The latter mentioned gates are connected to the output terminals of the flip-flop in the succeeding register element, i.e. element $B_n$, so that in the absence of an error signal, if the bit stored in the succeeding memory element ($B_n$) is a "1," gate 68 is enabled to set flip-flop 51 of element $B_{n-1}$ to set it to a binary "1" state. On the other hand, if the bit stored in the succeeding register element $B_n$ is a binary "0," gate 69 is enabled resetting flip-flop 51 to a binary "0" state.

Summarizing the foregoing description, in accordance with the teachings of the present invention, a system is provided for automatically checking out the operation of a memory track and the circuitry associated therewith. This is accomplished by writing into the memory track a binary sequence, bit by bit, which circulates through a storing element such as one of the elements of the shift register 12. Then during a read mode of operation, the bits circulating through the register element and the bits from the memory are supplied to compare logic unit, bit by bit, to be compared therein. If the bits supplied during each clock pulse time interval are the same, thereby indicating that the proper bit was stored and read out from the memory, the bit stored in the particular register element is shifted to a preceding register element, similar to that performed in a conventional shift register. However, if the bits supplied to the compare logic unit differ from one another, thereby indicating that some error occurred in storing and/or retrieving the particular bit, the bit received from memory rather than that from the register element is stored in a preceding register element and the read operation disrupted to indicate to an operator the malfunctioning of the particular memory track.

Although herebefore, the invention has been described in conjunction with a single compare logic unit, used to check out a single memory track, the invention need not be limited thereto. Rather, each of the register elements may be associated with another compare logic unit, so that a plurality of memory tracks may be simultaneously checked out, in order to reduce the time and cost required for memory check out. For a better understanding of the system required for automatically checking out a plurality of memory tracks simultaneously, reference is made to FIGURE 6, which is similar to FIGURE 1, wherein are diagrammed shift register 12, compare logic unit 40 associated with register element $B_n$, and the display panel 45 with the plurality of indicators 46 mounted thereon. Element $B_n$ and unit 40 are connected to track 30*x* and the associated circuitry thereof such as the read and write amplifier in a manner similar to that described herebefore. In addition however, element $B_{n-1}$ and a compare logic unit 75 are shown coupled to circuitry associated with track 30*y* (see FIGURE 3) so that both tracks and the associated circuitry thereof may be simultaneously checked out. That is, during the write mode of operation, the bits circulating through element $B_n$ are stored in track 30*x* while the bits circulating in element $B_{n-1}$ are stored in track 30*y* by means of magnetic head 33 and an associated write amplifier. Then during the read mode as compare logic unit 40 compares the bits supplied thereto from element $B_n$ and those retrieved from track 30*x*, the bits from element $B_{n-1}$ and those read out from track 30*y* are supplied to compare logic unit 75 to compare the bits therein and provide an error indicating signal such as that designated E in FIGURE 5 to the error indicating flip-flop 42, to disrupt the read operation of the system. Thus an error signal provided by either logic unit may disrupt the read operation.

In order to enable the operator to determine which of the compare logic units provides such an error signal, and thereby determine which of the tracks does not operate properly, each of the register elements is connected to another of the indicators 46 on the display panel 45. These indicators may comprise of light bulbs or numeric indicators which represent the bits stored in the register elements. Once the read operation is disrupted, the operator, by observing the indicators 46 determines which of the compare logic units provided the error indicating signal. For example, let us assume that at a clock pulse time interval $t_x$ during the read mode, elements $B_{n-1}$ through $B_{n+1}$ store bits 1001 respectively which are represented by the ones and zeroes in indicators 46 in FIGURE 6, as well as, in row R1 of FIGURE 7 to which reference is made herein. It is appreciated therefore from the foregoing description that if during a subsequent clock pulse time interval neither logic unit provides an error signal, the bits in the various shift register elements will shift to the right so that bits 1100 will be stored in the four elements as represented in row R2. However, if during such time interval the two bits supplied to compare logic unit 40 differ from one another, i.e. the bit from track 30*x* is a binary "1" rather than a binary "0," the bit transferred to the preceding register element that is element $B_{n-1}$, will be a "1" rather than a "0" so that the bits stored in the four elements will comprise 1110 as shown in row R3. Thus the operator, by observing the display panel and noticing which of the register elements stores a bit which is not in the proper sequence, determines which of the tracks is malfunctioning. In the foregoing examples since the bit stored in element $B_{n-1}$ is the wrong one for the proper sequence, the operator determines that the track associated with the succeeding register element, i.e. element $B_n$, malfunctions. Similarly, if an error signal is provided by logic unit 75, indicating that track 30*y* is malfunctioning the erroneous bit will be stored in the preceding element $B_{n-1}$. Thus for example instead of storing bits 1100 as diagrammed in row R2, the bits displayed in indicators 46 will be 1101 as represented in row R4.

From the foregoing, it should be appreciated that the number of memory tracks and associated circuitry therewith which may be simultaneously automatically checked out depends on the number of elements of the shift register. Generally, it may be stated that the number of tracks which may be simultaneously automatically checked out is equal to the number of elements of the register. For example, a sixteen element shift register may be utilized to simultaneously check out sixteen memory tracks with their associated circuitry and thereafter switch the outputs of the shift register elements and the inputs to the compare logic units associated therewith to another group of sixteen memory tracks so that all the tracks of the memory may be checked out. Thus the time required for checking out a multitrack memory is greatly reduced. Furthermore, it should be pointed out that the operation of checking out is substantially automatic with an operator's attention only being required when any of the tracks is found to be malfunctioning, indicated by the disruption of the read operation and the sequential shifting of the bits in the shift register.

Although herebefore it has been assumed that the track being checked out stores all the bits circulating through one of the shift register elements associated therewith, it should be appreciated that only selected portions of the track in which meaningful data is not stored may be used for storing such bits during the write mode and retrieving them during the read mode in order to test the operation of the track and the associated circuitry thereof. For example, let us assume that the track being checked out comprises a plurality of sectors such as diagrammed in FIGURE 8 to which reference is made herein, wherein each sector is shown including a plurality of bit locations in which data is stored followed by a plurality of bits which could be used for testing purposes. Then it is appreciated by those familiar with the art that the memory may be operated so that the bits from one of the register elements are stored only in the test bit portion of each of the sectors, thereby preventing the altering of any of the stored data therein. Then, during the read mode, only the test bits are read out for comparison with the bits from the particular register element. Thus the track may be tested out without altering any of the data stored in the plurality of sectors thereof.

Due to the versatility of the system in automatically checking out a plurality of magnetic tracks, it may be conveniently employed to check out cross interference often resulting from adjacently located magnetic heads which affect the bits stored or retrieved from adjacent tracks. For example, the check out system may be utilized to conveniently write bit sequences in all odd and even tracks of a multitrack magnetic disc. Thereafter, all the odd tracks may be read out and new sequences rewritten therein if the odd tracks are found to be operating properly. After rewriting new sequences in the odd tracks, the even tracks may be read out to determine the effect thereon due to the sequences written in the odd tracks. Thereafter, new sequences may be written into the even tracks and the effect of the last operation on the adjacent odd tracks determined, by reading out the sequences previously stored in the odd tracks. Thus, by repeatedly storing different sequences in alternate tracks, cross interference between adjacent tracks may be detected and remedial steps taken to minimize such interference so that the bits stored in each track correspond only to signals supplied to the particular head associated therewith.

There has accordingly been shown and described herein a novel system for automatically checking out a memory and its associated tracks. The system may be operated to check out each track and its associated circuitry at a time or preferably simultaneously check out a plurality of tracks with their associated circuits. Any malfunctioning in any of the tracks disrupts a read operation of the system to enable the operator to determine which of the tracks is malfunctioning. It is appreciated that those familiar with the art may make modifications in the arrangements as shown and/or substitute equivalents therefor without departing from the spirit of the invention. Therefore, all such modifications and/or equivalents are deemed to fall within the scope of the invention as claimed in the appended claims.

What is claimed is:

1. In combination with a memory including storing means, first means for serially writing bits of data in said storing means and second means for serially reading out the bits of data stored in said storing means, a source of clock pulses for defining fixed time intervals, said memory being operable in write and read modes, a system for automatically checking out the performance of said storing means and said first and second means, said check out system comprising:

an element means for sequentially storing each bit of a predetermined sequence of bits;

means connecting said element means to said first means for writing the bits sequentially stored in said element means in said storing means when said memory is operable in said write mode;

comparing means connected to said element means and said second means and responsive during each selected time interval of said read mode to the bit stored in said element means and the bit read out by said second means during said selected time interval for providing an error signal whenever the bits supplied thereto differ from one another;

error sensitive means responsive to said error signal for disrupting the sequential read out of bits by said second means and the sequential storing of bits in said element means, said element means being a selected element of a plurality of bistable elements interconnected to form a shift register, said elements being arranged in a sequence, the stable state of each element representing the bit stored therein, said shift register having interconnected input and output means and means responsive to said clock pulses for transferring during each clock pulse time interval the bit stored in each element to a preceding element, whereby said selected element sequentially stores the bit transferred thereto from the succeeding element thereof, said first and second means defining write and read amplifiers respectively;

the combination further including means responsive to said error signal for storing the bit transferred from said read amplifier to said comparing means in the element preceding said selected element rather than the bit stored in said selected element.

2. The combination recited in claim 1 wherein said memory includes at least $n$ storing means each associated with a write and a read amplifier, and said check out system includes $n$ comparing means, $n$ being an integer not greater than the number of elements of said shift register, each of said $n$ comparing means being associated with one of said shift register elements and a pair of write and read amplifiers associated with one of said $n$ storing means;

means connecting each of said $n$ shift register elements to its respective write amplifier for storing during each clock pulse interval in the write mode the bit in said element in the storing means associated therewith;

means connecting each comparing means to the shift register element and the read amplifier associated therewith for comparing during each clock pulse time interval in the read mode the bits supplied thereto to provide an error signal whenever the bits differ from one another, means connecting each of said $n$ comparing means to said error sensitive means, said error sensitive means being responsive to an error signal from any of said $n$ comparing means to disrupt the sequential readout of bits from each of said $n$ storing means and the sequential storing of bits in the plurality of elements of said shift register; and display means coupled to the shift register for displaying the bits stored in the elements thereof.

3. In combination with a memory including a plurality of storing means each capable of storing bits of data, a plurality of write means for controlling the storing of bits in said storing means during clock pulse time intervals in a write mode of operation, a plurality of read means for controlling sequential readout of bits from said storing means during clock pulse time intervals in a read mode of operation, a system for automatically simultaneously checking out the performance of $n$ said write and read means and $n$ of said storing means comprising:

$n$ elements each having two stable states of operation for storing a bit as a function of the state thereof;

means for sequentially storing bits of predetermined sequences in each of said $n$ elements;

means connecting each element to one of said write means for sequentially storing during said write mode the bits in said element in one of said storing means, each bit being stored during another of said clock pulse time intervals;

$n$ comparing means each connected to one of said elements and the read means associated with the storing means in which the bits from said elements are stored for comparing during each clock pulse time interval in said read mode bits supplied thereto, each comparing means further including means for providing an error signal when the bits differ from one another; and error sensitive means connected to said $n$ comparing means responsive to an error signal from any one of said $n$ comparing means for disrupting the sequential readout of bits from said storing means of said memory and the sequential storing of bits in said $n$ elements;

said $n$ elements comprise at least a part of a multi-element circulating shift register, said elements being arranged in a sequence, said register including means for transferring the bit stored in each element to a preceding element in said sequence during each of said clock pulse time intervals, in said write and read modes, each of said comparing means further including means responsive to the error signal produced by the comparing means as a function of the difference in the bits supplied thereto from one of said read means and one of said $n$ elements for transferring the bit received from said read means to an element in said shift register preceding said one element.

4. The combination defined in claim 3 further including display means coupled to the elements of said shift register to indicate the bits stored therein during at least each clock pulse time interval in the read mode.

5. The combination defined in claim 4 wherein said memory comprises a magnetic disc type memory including at least one rotatable disc having a surface coated with magnetic material, said pluralities of write and read means comprising a plurality of write amplifiers, a plurality of read amplifiers and a plurality of magnetic write/read heads, each head being coupled to one write amplifier and one read amplifier, the portion of the disc's surface passing by each head as said disc is rotated defining one of said storing means, each of said

*n* elements being coupled to one write amplifier to energize the head associated therewith so as to store in the surface of the disc passing thereby a bit from said element, during each of said clock pulse time intervals in said write mode, and each of said comparing means being coupled to one of said read amplifiers to receive the bits read out by the head associated with said read amplifier from the disc's surface passing thereby, whereby the absence of an error signal by said comparing means is indicative of the proper performance of the magnetic head, the write and read amplifiers associated therewith and the proper magnetic characteristics of the disc's surface passing by said head.

References Cited

UNITED STATES PATENTS

| | | | |
|---|---|---|---|
| 3,045,217 | 7/1962 | Housman et al. | 340—172.5 X |
| 3,213,428 | 10/1965 | Bianchi et al. | 340—172.5 |
| 3,252,149 | 5/1966 | Weida et al. | 340—172.5 |
| 3,311,890 | 3/1967 | Waaben | 340—172.5 |
| 3,336,579 | 8/1967 | Heymann | 340—172.5 |

PAUL J. HENON, *Primary Examiner.*

H. E. SPRINGBORN, *Assistant Examiner.*

U.S. Cl. X.R.

340—146.1